United States Patent
Lei

(10) Patent No.: US 10,148,105 B2
(45) Date of Patent: Dec. 4, 2018

(54) BATTERY CLAMP

(71) Applicant: Shenzhen Carku Technology Co., Ltd., Shenzhen (CN)

(72) Inventor: Yun Lei, Shenzhen (CN)

(73) Assignee: SHENZHEN CARKU TECHNOLOGY CO, LTD., Longgang District, Shenzhen (CN)

( * ) Notice: Subject to any disclaimer, the term of this patent is extended or adjusted under 35 U.S.C. 154(b) by 0 days.

(21) Appl. No.: 15/245,146

(22) Filed: Aug. 23, 2016

(65) Prior Publication Data
US 2018/0006478 A1   Jan. 4, 2018

(30) Foreign Application Priority Data

Jun. 30, 2016  (CN) .......................... 2016 1 0506106
Jun. 30, 2016  (CN) .......................... 2016 1 0506137
Jun. 30, 2016  (CN) .................... 2016 2 0692248 U

(51) Int. Cl.
*H02J 7/00* (2006.01)

(52) U.S. Cl.
CPC .......... *H02J 7/0045* (2013.01); *H02J 7/0029* (2013.01); *H02J 7/0047* (2013.01); *H02J 7/0054* (2013.01); *H02J 2007/0096* (2013.01)

(58) Field of Classification Search
CPC ...... H02J 7/0034; H02J 7/0054; H02J 7/0042; H02J 2001/006; Y02E 60/12

(Continued)

(56) References Cited

U.S. PATENT DOCUMENTS

2005/0110467 A1* 5/2005 Thomason ............ H02J 7/0031
                                                         320/165
2007/0018609 A1* 1/2007 Yen ....................... H02J 7/0034
                                                         320/107

(Continued)

FOREIGN PATENT DOCUMENTS

DE     202015103173 U1   7/2015
EP        2660950 A2    11/2013

(Continued)

OTHER PUBLICATIONS

The extended European search report for EP16189161.6, dated Feb. 20, 2017.

*Primary Examiner* — Arun Williams
(74) *Attorney, Agent, or Firm* — Jun He Law Offices P.C.; James J. Zhu

(57) ABSTRACT

The present invention provides a battery clamp, comprising: a first and second wire clamps and a control device. Each of the first and second wire clamps is electrically connected to the control device. The control device comprises: a housing; a master-control board mounted within the housing; and connectors disposed at one side of the housing, and being electrically connected to the master-control board, comprising: at least a first and second electrode connectors, which are connected to an external power supply for receiving power, and at least one communication connector connected to the external power supply for building a communication connection between the battery clamp and the external power supply. The battery clamp is communicatively connected to the external power supply by the communication connector, thereby effectively solving the problems of a lithium battery in an external power supply e.g. battery bulge or explosion resulted from improper uses.

10 Claims, 10 Drawing Sheets

(58) Field of Classification Search
USPC .......................................................... 320/105
See application file for complete search history.

(56) References Cited

U.S. PATENT DOCUMENTS

| | | |
|---|---|---|
| 2007/0123316 A1 | 5/2007 | Little |
| 2010/0173182 A1 | 7/2010 | Baxter et al. |
| 2012/0139491 A1 | 6/2012 | Eberhard et al. |
| 2013/0099736 A1* | 4/2013 | Roberts .................. F02N 11/12 320/109 |
| 2013/0169038 A1 | 7/2013 | King |
| 2013/0264995 A1 | 10/2013 | Lee |
| 2014/0265592 A1* | 9/2014 | Clarke ...................... H02J 1/06 307/66 |
| 2014/0315048 A1 | 10/2014 | Yang |
| 2015/0054467 A1 | 2/2015 | Takano et al. |
| 2016/0001666 A1 | 1/2016 | Nook et al. |
| 2016/0336770 A1 | 11/2016 | Benz et al. |

FOREIGN PATENT DOCUMENTS

| | | |
|---|---|---|
| FR | 3013164 A1 | 5/2015 |
| JP | 2010252520 A | 11/2010 |
| KR | 20120130432 A | 12/2012 |
| WO | 2016/003471 A1 | 1/2016 |

\* cited by examiner

BATTERY CLAMP

CROSS REFERENCE TO PRIORITY

This application claims priority to Chinese Patent Application No. 201620692248.3 filed Jun. 30, 2016. This application also claims priority to Chinese Patent Application No. 201610506106.8 filed Jun. 30, 2016. This application further claims priority to Chinese Patent Application No. 201610506137.3 filed Jun. 30, 2016. The disclosure of these applications are incorporated by reference herein in its entirety.

TECHNICAL FIELD

The present invention relates to the technical field of electronic battery and charging control and, in particular, to a battery clamp.

BACKGROUND

Nowadays the technology of applying a high power lithium battery to an emergency power supply is gradually developing. A high power lithium battery has many advantages, such as a long service life, less pollution, small size and good portability etc. However, a lithium battery may have some defects in real-life applications. For example, when being used for starting a vehicle, the starting electric current of a lithium battery could be very large (up to 1000 A). In addition, improper uses, e.g., high temperature and over-charging or over-discharging, will result in battery bulge of an emergency power supply, or even an explosion, which may cause personal injury and property loss, Although certain smart battery clamps can accommodate a large electric current during the starting of a vehicle, they cannot adjust operating modes of a battery clamp based on the actual operating condition of a starting power supply.

Therefore, its desired to provide a novel battery clamp. The aforesaid problems can be solved by establishing a communication connection between the novel battery clamp and a starting power supply.

SUMMARY

The purpose of the present invention is to provide a battery clamp, which aims to solve the aforementioned problems of a lithium battery in an external power supply e.g. battery bulge or explosion resulted from improper uses.

In order to solve the aforesaid problems, the present invention provides a battery clamp, comprising: a control device, comprising: a housing; a master-control board mounted within the housing; and connectors disposed at one side of the housing, and being electrically connected to the master-control board, comprising: at least a first and second electrode connectors, which are connected to an external power supply for receiving power, and at least one communication connector connected to the external power supply for receiving status information of the external power supply, and sending the status information to the master-control board; a first and second wire clamps, one ends of the first and second wire clamps are configured to receive power from the external power supply via the control device, and the other ends of the first and second wire clamps are connected to an external device for supplying power to the external device; wherein the control device is configured to control power supply from the external power supply to the external device based on the status information.

Preferably, the control device is configured to allow the power supply from the external power supply to the external device when the status information is normal, wherein the status information comprises at least one of the following: temperature, voltage of a battery unit of the external power supply.

Preferably, the master-control board comprises: a first and second voltage input ports electrically connected to the first and second electrode connectors respectively; a communication port electrically connected to the communication connector; a first and second voltage output ports electrically connected to the first and second wire clamps for supplying power to the external device via the first and second wire clamps; a switch control unit for controlling connection between the first voltage input port and the first voltage output port; and a master-control circuit unit connected to the communication port for obtaining the status information of the external power supply; wherein the master-control circuit unit is configured to control the switch control unit based on the status information of the external power supply, thereby controlling connection on/off between the first voltage input port and the first voltage output port.

Preferably, the master-control circuit unit further comprises: an electric current detection unit for detecting electric current from the external power supply to the external device; a voltage detection unit for detecting voltage of the external power supply and the external device; and wherein the master-control circuit unit is configured to compare the electric current value and the voltage value with a predefined electric current range and a predefined voltage range respectively, thereby controlling the switch control unit.

Preferably, the voltage detection unit comprises: a first voltage detection unit for detecting voltage value of the external power supply; and a second voltage detection unit for detecting voltage value of the external device Preferably, the master-control circuit unit further comprises: an indicator light circuit unit connected to the master-control chip unit for indicating operating status of the control device.

Preferably, the master-control circuit unit further comprises: a buzzing circuit unit connected to the master-control chip unit for alerting users about abnormal condition.

Preferably, the communication connector is disposed between the first and second electrode connectors.

Preferably, the housing comprises an upper piece and a lower piece, which are removably connected together, and the master-control board is mounted on the lower piece.

Preferably, one side of the upper piece is provided with openings for indicator lights and buttons.

The battery clamp is configured to build a communication connection between the communication connector and an external power supply, by which status information of the external power supply can be transmitted. Based on the status information, detected electric current and voltage value, the power supply from an external power supply to an external device can be controlled, thereby effectively solving the problems of a lithium battery in an external power supply e.g. battery bulge or explosion resulted from improper uses.

BRIEF DESCRIPTION OF THE DRAWINGS

In order to clearly understand the technical solution in the embodiments of the present invention, drawings that used for the embodiments or prior art will be briefly introduced below. Obviously, the drawings described below are merely some embodiments of the present invention. For a person skilled in the art, other drawings can be obtained according to these drawings below without any inventive effort.

DETAILED DESCRIPTION

The present invention is further described below along with the drawings and embodiments, in order to clearly understand the purpose, technical solution and advantage thereof.

Figure 1:
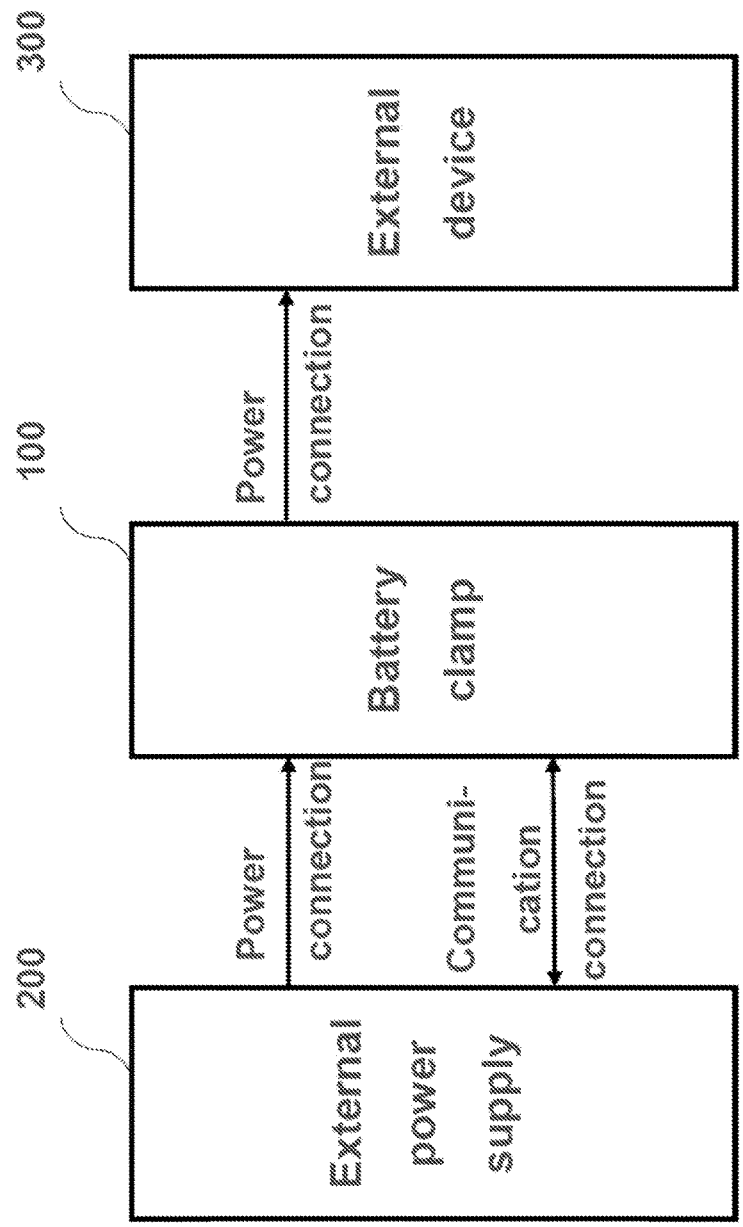
FIG. 1 is a diagram illustrating a battery clamp in connection with an external power supply and an external device according to one embodiment of the present invention.

FIG. 1 is a diagram illustrating a battery clamp 100 in connection with an external power supply 200 and an external device 300 according to one embodiment of the present invention.

As shown in FIG. 1, the connection between the battery clamp 100 and the external power supply 200 comprises a power connection, by which the battery clamp 100 can obtain power supply from the external power supply 200. Generally, the power connection is implemented by a pluggable interface.

The connection between the battery clamp 100 and the external power supply 200 also comprises a communication connection, by which the battery clamp 100 can obtain status information of the external power supply 200. The communication connection can be wired connections, such as via a serial interface, or can be wireless connections, such as via Bluetooth, NFC, Wi-Fi etc.

As shown in FIG. 1, the battery clamp 100 is configured to use a power connection for supplying power to the external device 300.

Figure 2:
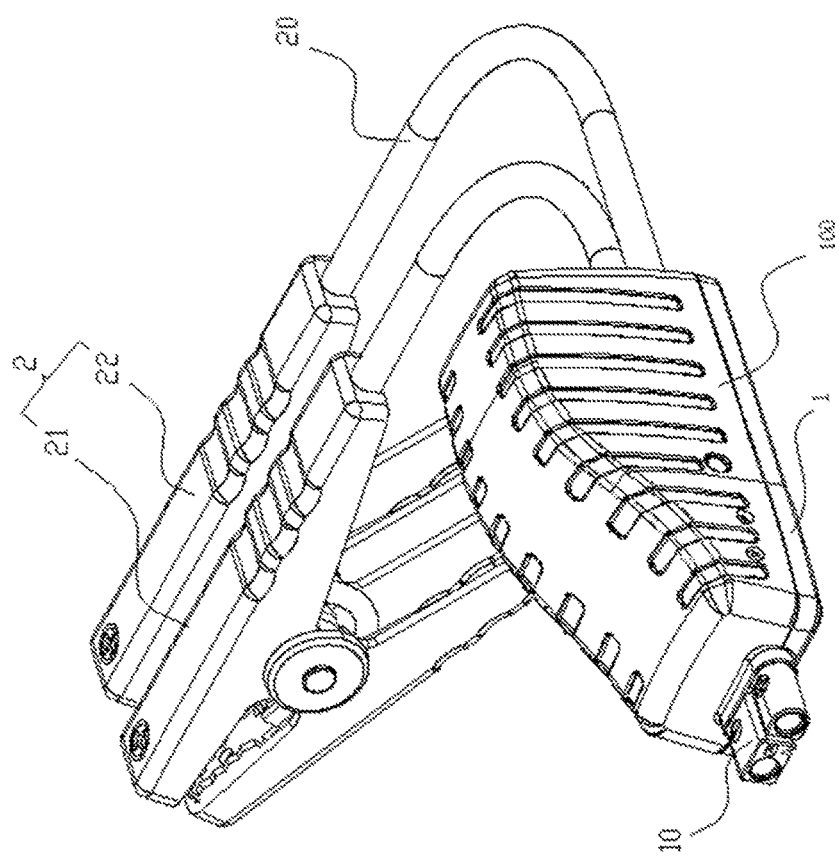
FIG. 2 is a structure diagram of a battery clamp according to one embodiment of the present invention.

FIG. 2 is a structure diagram of the battery clamp 100 according to one embodiment of the present invention.

As shown in FIG. 2, the battery clamp 100 comprises a control device 1 and wire clamps 2. One side of the control device 1 is provided with connectors 10, and the other side is provided with wires 20. The control device 1 and the wire clamps 2 are connected via the wires 20. The wire clamps 2 comprises a first and second wire clamps 21, 22 representing an positive and negative electrodes respectively.

The wire clamps 2 are connected to the external device 300 for supplying power to it. For example, when the external power supply 200 is an emergency starting power supply and the external device 300 is a vehicle, the emergency starting power supply 200 is connected to the vehicle 300 via the battery clamp 100 for starting the vehicle 300.

Figure 3:
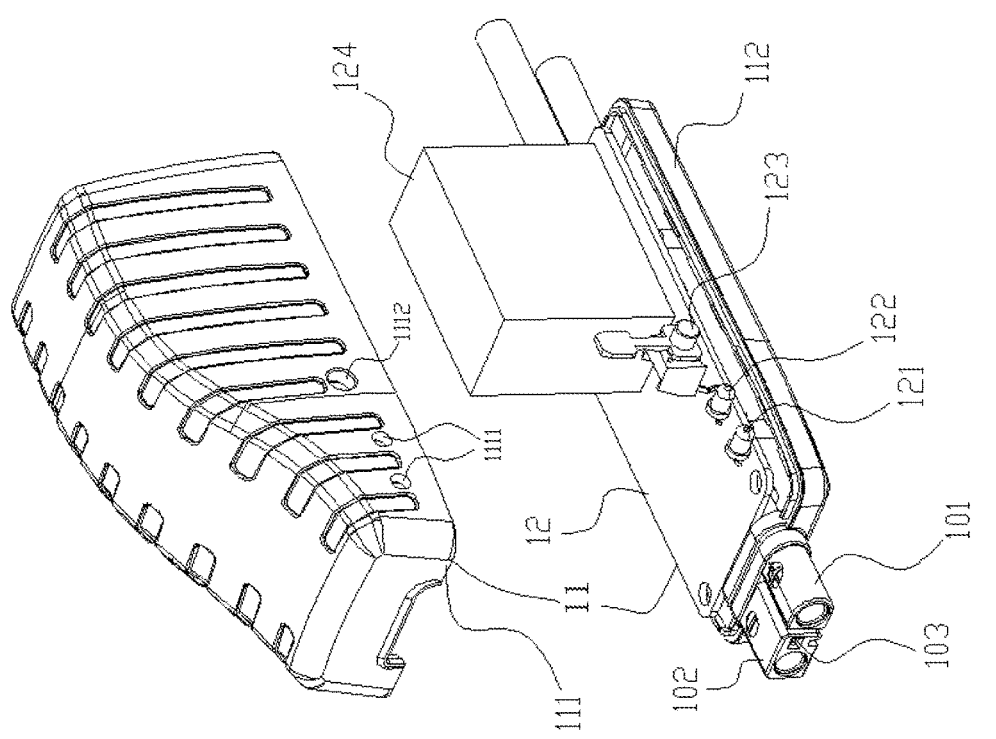
FIG. 3 is a structure diagram illustrating a control device of a battery clamp according to one embodiment of the present invention.

FIG. 3 is a structure diagram illustrating a control device of the battery clamp 100 according to one embodiment of the present invention.

As shown in FIG. 3, the control device 1 comprises: a housing 11, a master-control board 12 and connectors 10. The housing 11 comprises an upper piece 111 and a lower piece 112 which are removably connected together.

The master-control board 12 is mounted within the housing 11. Specifically, the master-control board 12 is mounted on the lower piece 112.

The connectors 10 are disposed at one side of the housing 11, and are electrically connected to the master-control board 12.

The connectors 10 comprise a positive electrode connector 101, a negative electrode connector 102 and a communication connector 103. According to one embodiment of the present invention, the communication connector 103 is disposed between the positive electrode connector 101 and the negative electrode connector 102.

The positive and negative electrode connectors 101, 102 are connected to the external power supply 200 for receiving power supply.

A communication connection between the battery clamp 100 and the external power supply is built via the communication connector 103. The battery clamp 100 can obtain status information of the external power supply 200 via the communication connector 103, thereby monitoring and managing the external power supply 200 to prevent bulge or explosion of the external power supply 200.

According to one embodiment of the present invention, the control device 1 is configured to allow the power supply from the external power supply 200 to the external device 300 when the status information is normal.

According to one embodiment of the present invention, the status information of the external power supply 200 comprises at least one of the following: temperature, voltage of a battery unit of the external power supply 200.

According to one embodiment of the present invention, the master-control board 12 of the control device 1 comprises voltage input ports BATs, voltage output ports CARs, a communication port COM, a switch control unit K1, and a master-control circuit unit 128.

Figure 4:
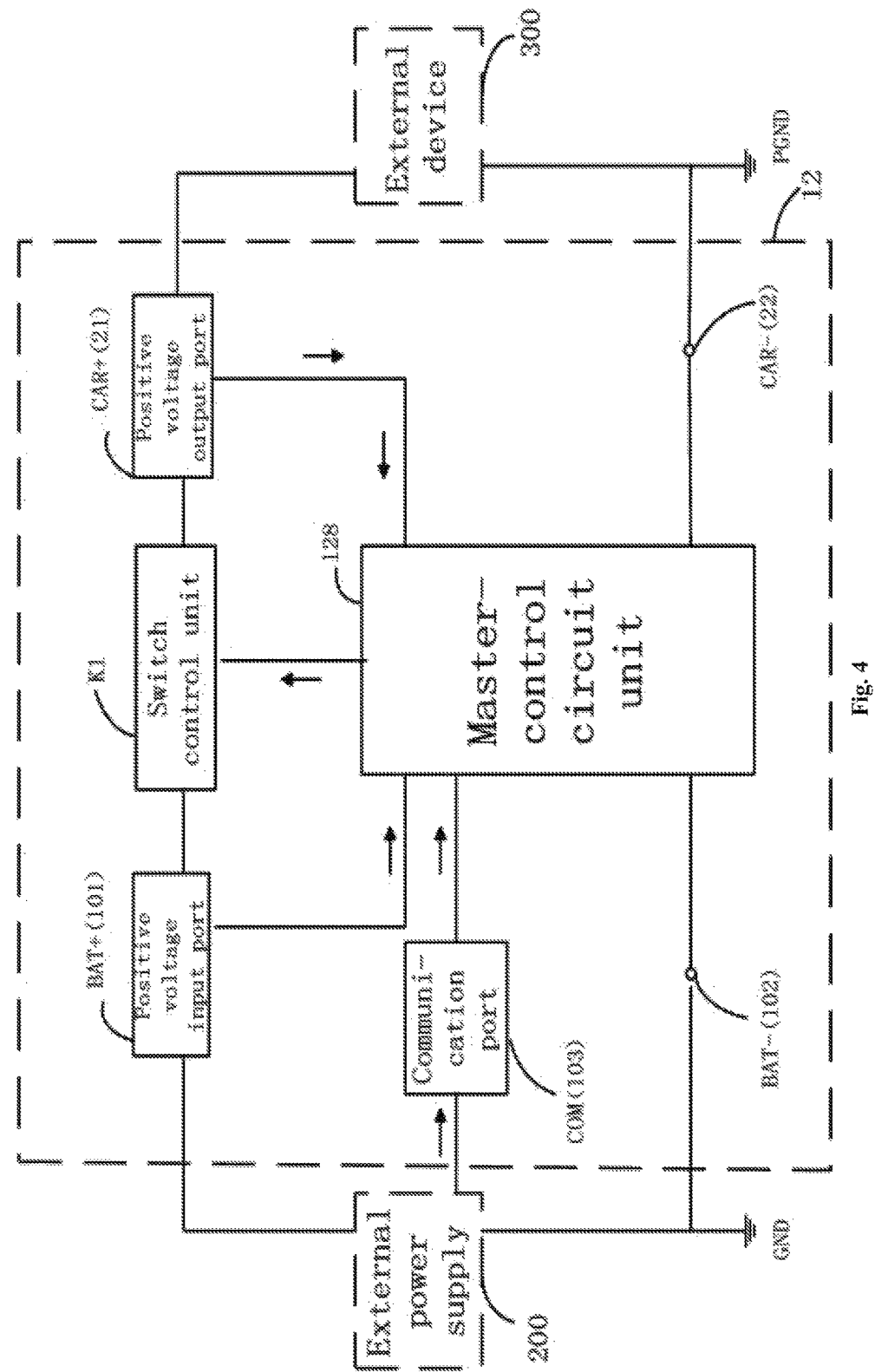
FIG. 4 is a diagram illustrating a circuit module of a master-control board according to one embodiment of the present invention.

FIG. 4 is a diagram illustrating a circuit module of the master-control board 12 according to one embodiment of the present invention.

As shown in FIG. 4, the master-control board 12 comprises: voltage input ports BATs (including a positive voltage input port BAT+ and a negative voltage input port BAT−), voltage output ports CARs (including a positive voltage output port CAR+ and a negative voltage output port CAR−), a communication port COM, a switch control unit K1 and a master-control circuit unit 128.

As discussed above, the positive and negative electrode connectors 101, 102 are connected to the external power supply 200 for receiving power supply. The positive voltage input port BAT+ and the negative voltage input port BAT− are electrically connected to the electrode connectors 101, 102 respectively, i.e. the voltage input ports BATs are electrically connected to the external power supply 200, for receiving power supply from the external power supply 200.

As discussed above, the control device 1 is connected to the wire clamps 2 via the wires 20, and the wire clamps 20 are connected to the external device 300 for supplying power via the wire clamps 20. The positive voltage output port CAR+ and the negative voltage output port CAR− are electrically connected to the first and second wire clamps 21, 22 respectively, i.e. the voltage output ports CARs are electrically connected to the external device 300, for supplying power to the external device 300.

The positive voltage input port BAT+ is connected to the positive voltage output port CAR+ via the switch control unit K1. The switch control unit K1 is configured to control connection on/off between the positive voltage input port BAT+ and the positive voltage output port CAR+.

The switch control unit K1 is connected to and controlled by the master-control circuit unit 128.

The master-control circuit unit 128 is connected to the communication port COM for receiving status information of the external power supply 200.

The master-control circuit unit 128 is also connected to the positive voltage input port BAT+ or the positive voltage output port CAR+ for detecting voltage values of them, i.e. detecting voltage values of the external power supply 200 or the external device 300.

The master-control circuit unit 128 is also connected to two grounding ports GND and PGND for detecting an electric current value from the external power supply 200 to the external device 300.

Based on the status information, the master-control circuit unit 128 can control the switching on/off of the switch control unit K1, thereby controlling the power supply from the external power supply 200 to the external device 300.

Similarly, based on the voltage values or electric current values detected by the master-control circuit unit 128, the master-control circuit unit 128 can control the switching on/off of the switch control unit K1, thereby controlling the power supply from the external power supply 200 to the external device 300.

Figure 5:
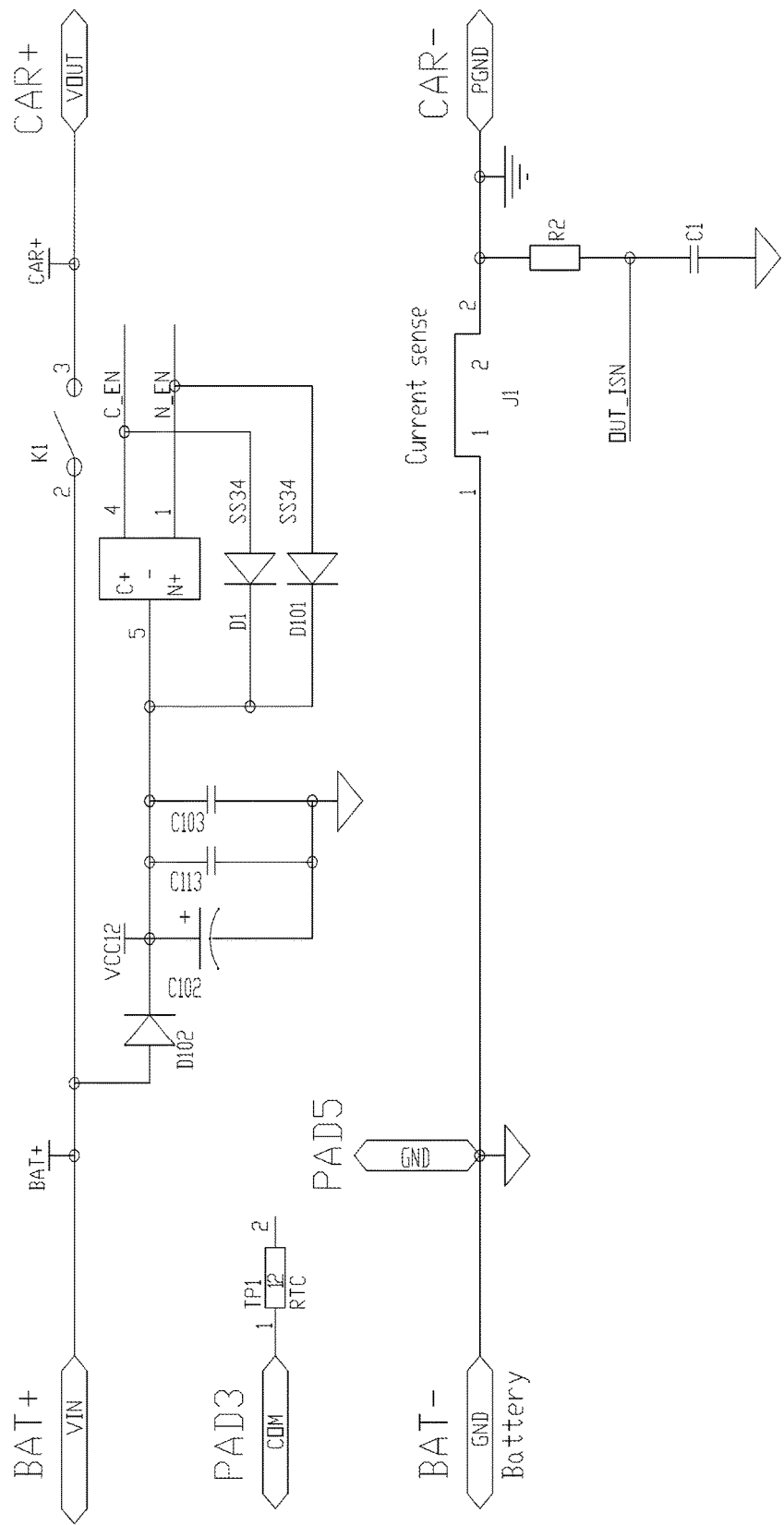
FIG. 5 is a circuit diagram illustrating voltage input ports, voltage output ports and a communication ports of a master-control board according to one embodiment of the present invention.

FIG. 5 is a circuit diagram illustrating voltage input ports BATs, voltage output ports CARs, a communication port COM and a switch control unit K1 of the master-control board 12 of the battery clamp 100.

As shown in FIG. 5, the voltage input ports BATs of the master-control board 12 comprises a positive voltage input port BAT+ and a negative voltage input port BAT−. The voltage output ports CARs of the master-control board 12 comprises a positive voltage output port CAR+ and a negative voltage output port CAR−.

The voltage input ports BATs are electrically connected to the electrode connectors. Specifically, the positive voltage input port BAT+ is electrically connected to the positive electrode connector 101 for receiving a positive output voltage from the external power supply 200; the negative voltage input port BAT− is electrically connected to the negative electrode connector 102 for receiving a negative output voltage from the external power supply 200.

The voltage output ports CARs are electrically connected to the wire clamps 20. Specifically, the positive voltage output port CAR+ is electrically connected to the first wire clamp 21 and the negative voltage output port CAR− is electrically connected to the second wire clamp 22 for supplying power to the external device 300.

In addition, FIG. 5 further illustrates the communication port COM and the switch control unit K1 of the master-control board 12.

The communication port COM is electrically connected to the communication connector 103.

The positive voltage input port BAT+ is connecter to the positive voltage output port CAR+ by the switch control unit K1.

The switch control unit K1 is also connected to the master-control circuit unit 128 via two input ports N_EN and C_EN, and is controlled by the master-control circuit unit 128. The master-control circuit unit 128 is connected to the switch control unit K1 for controlling the switching on/off of the switch control unit K1 based on status information of an external power supply.

When the switch control unit K1 is off, the positive voltage input port BAT+ is disconnected from the positive voltage output port CAR+, which means the power supply provided by the external power supply 200 is also disconnected from the external device 300. When the switch control unit K1 is on, the positive voltage input port BAT+ connects with the positive voltage output port CAR+, which means the power supply from the external power supply 200 is provided to the external device 300.

In another embodiment of the present invention, the master-control circuit unit 128 further comprises an electric current detection unit 1283, voltage detection units 1282 and a master-control chip unit 1281. The master-control circuit unit 128 is connected to the communication port COM for obtaining status information of the external power supply 200.

The master-control circuit unit 128 further comprises a power control unit for supplying the obtained external power to the electric current detection unit 1283, the voltage detection units 1282 and the master-control chip unit 1281.

Figure 6:
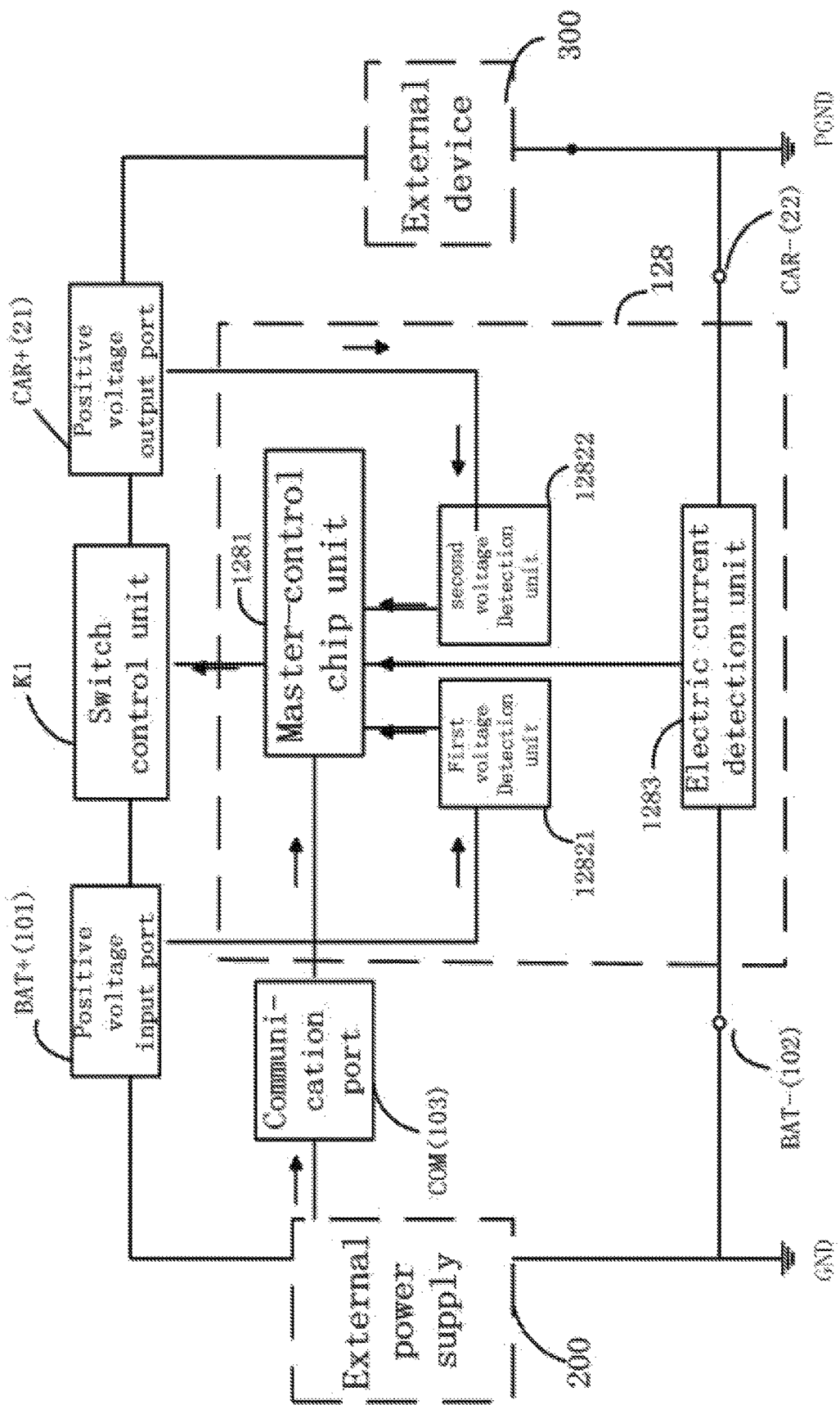
FIG. 6 is a diagram illustrating a module of a master-control circuit unit according to one embodiment of the present invention.

FIG. 6 is a diagram illustrating a module of a master-control circuit unit 128 according to one embodiment of the present invention.

As shown in FIG. 6, the master-control circuit unit 128 comprises a master-control chip unit 1281, an electric current detection unit 1283 and voltage detection units. The voltage detection units further comprises a first voltage detection unit 12821 and a second voltage detection unit 12822.

Input ports of the first and second voltage detection unit 12821 and 12822 are connected to the positive voltage input port BAT+ and the positive voltage output port CAR+ respectively, thereby detecting voltages of the positive voltage input port BAT+ and positive voltage output port CAR+, i.e. detecting voltages of the external power supply 200 and the external device 300. Output ends of the first and second voltage detection unit 12821 and 12822 are connected to the master-control chip unit 1281 for delivering the detected voltage values to the master-control chip unit 1281.

Input ports of the electric current detection unit 1283 are connected to two grounding ports GND and PGND for detecting an electric current value from the external power supply 200 to the external device 300. An output port of the electric current detection unit 1283 is connected to the master-control chip unit 1281 for delivering the detected electric current value to the master-control chip unit 1281.

The master-control chip unit 1281 is connected to the switch control unit K1, and is configured to control the switching on/off of the switch control unit k1 based on the detected electric current or voltage value, thereby controlling the power supply from the external power supply 200 to the external device 300.

FIGS. 7-11 are example circuit diagrams illustrating a power control unit, a master-control chip unit 1281, an electric current detection unit 1283, and voltage detection units 1282 respectively.

Figure 7:
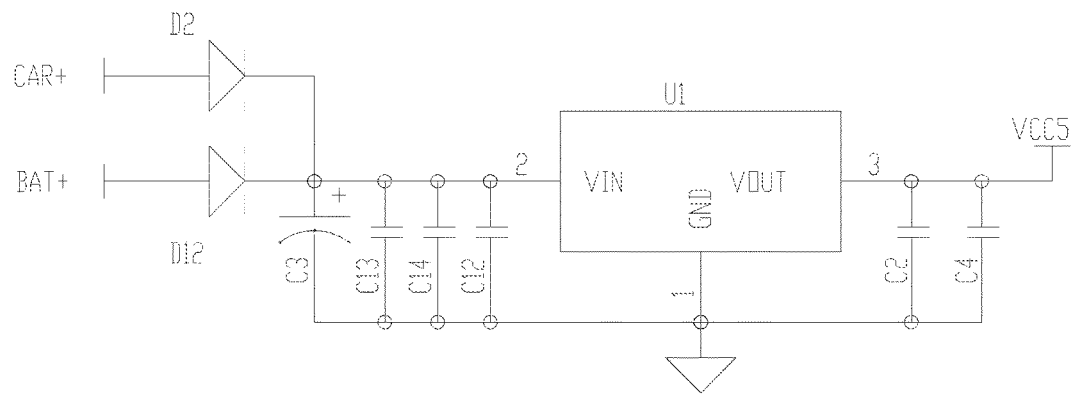
FIG. 7 is a circuit diagram illustrating a power control unit of a master-control circuit unit according to one embodiment of the present invention.

FIG. 7 is a circuit diagram illustrating a power control unit according to one embodiment of the present invention.

As shown in FIG. 7, the circuit of the power control unit comprises a power control chip U1, a plurality of capacitors, and two diodes.

The power control unit is respectively connected to the positive voltage input port BAT+ and the positive voltage output port CAR+ by the two diodes.

The power control unit is provided with a voltage output port VCC5. The voltage output port VCC5 is connected to VCC5 ports of the electric current detection unit 1283, the voltage detection units 1282, the master-control chip unit 1281 and an anti-inverse detection unit etc. for providing a drive voltage.

Figure 8:
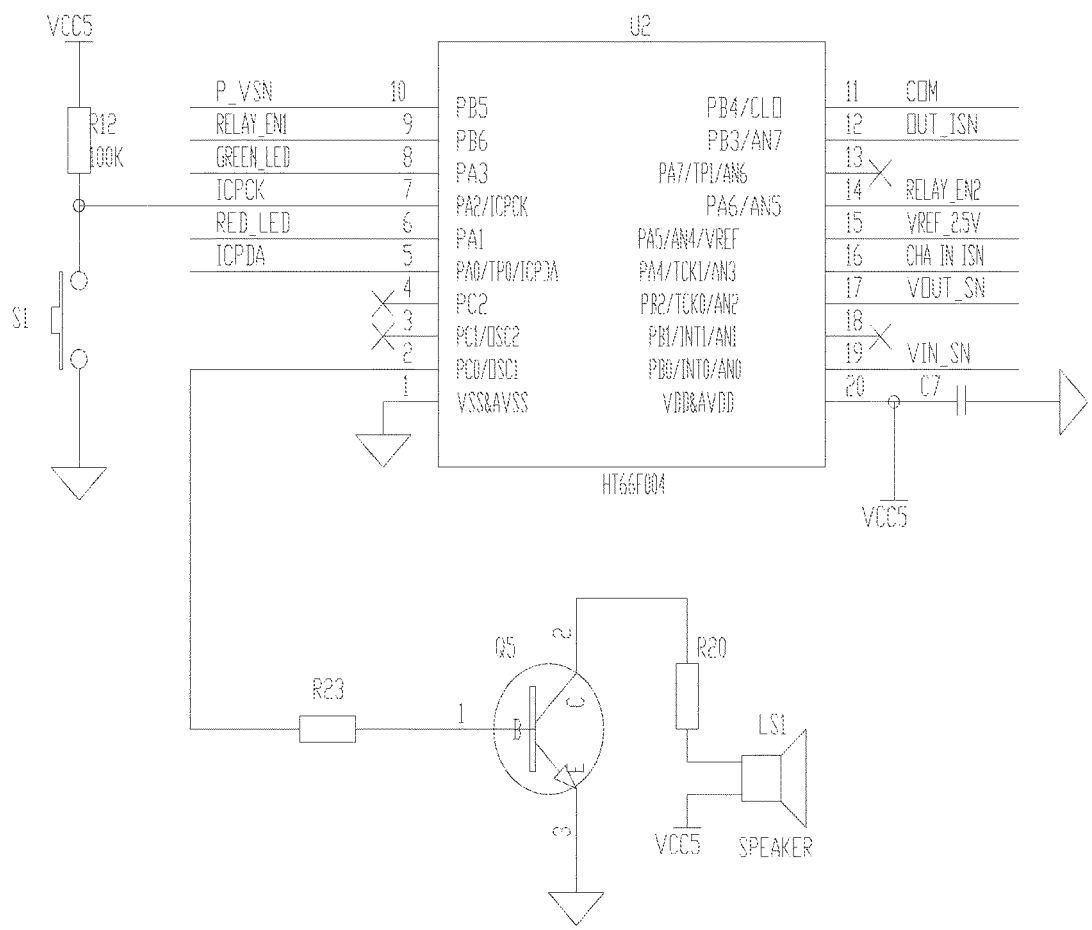
FIG. 8 is a circuit diagram illustrating a master-control chip unit of a master-control circuit unit according to one embodiment of the present invention.

FIG. 8 is a circuit diagram illustrating a master-control chip unit 1281 according to one embodiment of the present invention.

As shown in FIG. 8, the master-control chip unit 1281 comprises a control chip U2.

The 11$^{th}$ pin of the control chip U2 is connected to a communication port COM for communicating between the battery clamp 100 and the external power supply 200.

The control chip U2 is also provided with a programming port ICPCK. The programming port ICPCK, which is also powered by the voltage output port VCC5 of the power control unit, is used for programming relevant control program on the control chip U2, thereby storing instruction and data on the chip in advance.

Figure 9:
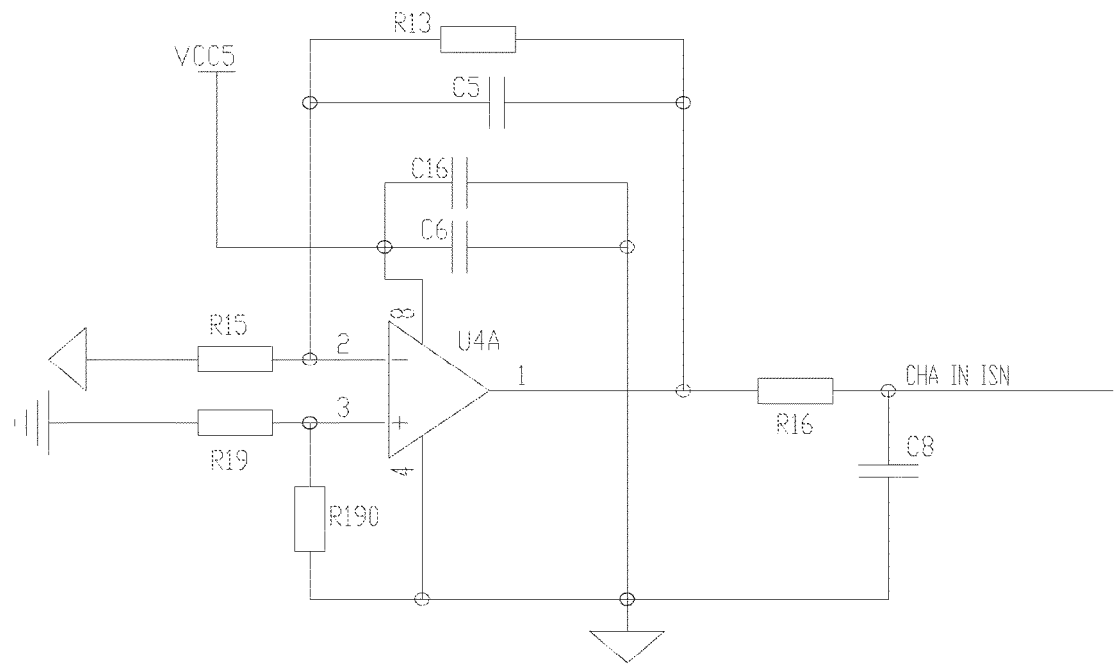
FIG. 9 is a circuit diagram illustrating an electric current detection unit of a master-control circuit unit according to one embodiment of the present invention.

FIG. 9 is a circuit diagram illustrating an electric current detection unit 1283 according to one embodiment of the present invention.

As shown in FIG. 9, the electric current detection unit 1283 comprises an amplifier U4A, and relevant capacitors and resistors The electric current detection unit 1283 is powered by the voltage output port VCC5 of the power control unit. Input ports thereof are connected to two grounding ports GND and PGND for detecting an electric current value of the voltage input ports BATs or the voltage output ports CARs, i.e. the electric current value from the external power supply 200 to the external device 300.

The electric current detection unit 1283 is also connected to the master-control chip unit 1281. Specifically, an output port CHA IN ISN of the electric current detection unit 1283 is connected to the 16$^{th}$ pin of CHA IN ISN of the control chip U2 for delivering a detected electric current value to the control chip U2.

According to one embodiment of the present invention, after obtaining a detected electric current value from the external power supply 200 to the external device 300, the master-control chip unit 1281 is configured to compare the detected electric current value with a predefined electric current range, i.e. a protection threshold of starting electric current, which is stored in the master-control chip unit 1281 in advance. If the detected electric current value exceeds the predefined electric current range, the master-control chip unit 1281 will switch off the switch control unit K1 by means of a pre-stored control program. Correspondingly, the power supply from the external power supply 200 to the external device 300 will be switched off as well. On the contrary, if the detected electric current value does not exceed the predefined electric current range, the power supply from the external power supply 200 to the external device 300 would be sustained.

TABLE 1

Parameters with regard to different types of external power supply

| Type of battery module | Operating voltage | Low voltage alert threshold | Protection threshold of starting electric current |
|---|---|---|---|
| 3C lithium cobalt oxide | 8.1-12.6 v | Voltage of one battery unit is below 2.7 v | 550 A |
| 4F lithium iron phosphate | 8-14.6 v | Voltage of one battery unit is below 2.0 v | 600 A |
| 4C lithium cobalt oxide | 10.8-16.8 v | Voltage of one battery unit is below 2.7 v | 600 A |

For example, as shown in Table 1, when the external power supply 200 is 3C lithium cobalt oxide, the predefined electric current range can be 0-550 A. If an electric current value from the external power supply 200 to the external device 300, which is obtained by the master-control chip unit 1281, exceeds 550 A, the master-control chip unit 1281 will switch off the switch control unit K1. Correspondingly, the power supply from the external power supply 200 to the external device 300 will be switched off as well. On the contrary, if the detected electric current value is below 550 A, the power supply from the external power supply 200 to the external device 300 would be sustained. Same rules would be applicable when types of the external power supply 200 are 4F lithium iron phosphate and 4C lithium cobalt oxide.

In one embodiment of the present invention, the status information, predefined current range and predefined voltage range are stored in the control chip U2 in advance.

In another embodiment of the present invention, the voltage detection units 1282 are connected to the master-control chip unit 1281. The voltage detection units 1282 are configured to detect voltage of the positive voltage input port BAT+ or the positive voltage output port CAR+, i.e. voltage of the external power supply 200 or the external device 300, and to send a detected voltage value to the master-control chip unit 1281.

In another embodiment of the present invention, the voltage detection units 1282 comprises a first and second voltage detection units.

Figure 10:
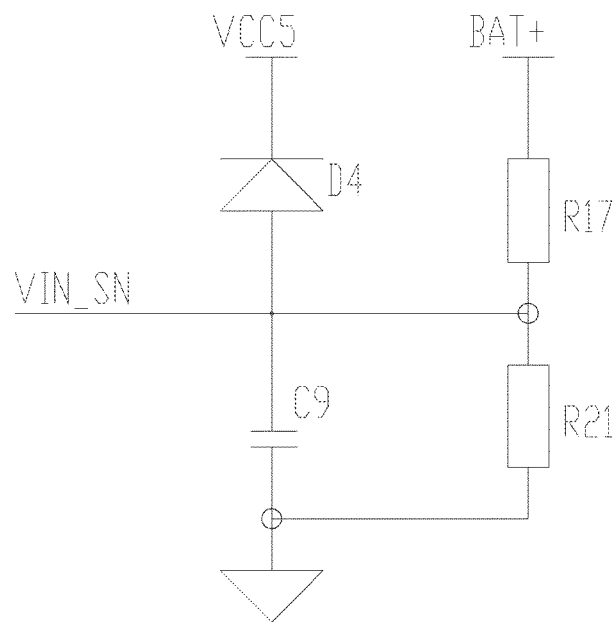
FIG. 10 is a circuit diagram illustrating a first voltage detection unit of voltage detection units of a master-control circuit unit according to one embodiment of the present invention.
Figure 11:
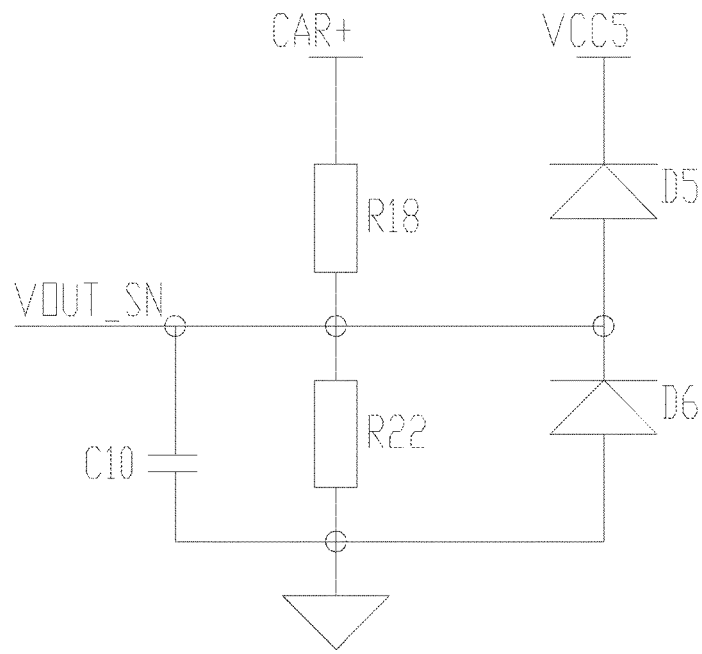
FIG. 11 is a circuit diagram illustrating a second voltage detection unit of voltage detection units of a master-control circuit unit according to one embodiment of the present invention.

FIGS. 10 and 11 are circuit diagrams illustrating a first and second voltage detection units respectively.

As shown in FIG. 10, the first voltage detection unit comprises a diode as well as relevant capacitors and resistors. A power port VCC5 of the first voltage detection unit is connected to the voltage output port VCC5 of the power control unit via the diode. An input port BAT+ of the first voltage detection unit is connected to the positive voltage input port BAT+. An output port VIN_SN of the first voltage detection unit is connected to the 19$^{th}$ pin of VIN_SN of the control chip U2 for detecting voltage value of the positive voltage input port BAT+, and then delivers the detected voltage value to the control chip U2.

As shown in FIG. 11, the second voltage detection unit comprises two diodes as well as relevant capacitors and resistors. A power port VCC5 of the second voltage detection unit is connected to the voltage output port VCC5 of the power control unit via the diodes. An output port CAR+ of the second voltage detection unit is connected to the positive voltage output port CAR+. An output port VOUT_SN of the second voltage detection unit is connected to the 17$^{th}$ pin of VOUT_SN of the control chip U2 for detecting voltage value of the positive voltage output port CAR+, and then delivers the detected voltage value to the control chip U2.

According to one embodiment of the present invention, after obtaining a voltage value of the positive voltage input port BAT+ or the positive voltage output port CAR+, the master-control chip unit 1281 is configured to compare the detected voltage value with a predefined voltage range, i.e. range of operating voltage, which is stored in the master-control chip unit 1281 in advance. If the detected voltage value is beyond the predefined voltage range, the master-control chip unit 1281 will switch off the switch control unit K1 by means of a pre-stored control program. Correspondingly, the power supply from the external power supply 200 to the external device 300 will be switched off as well. On the contrary, if the detected voltage value is not beyond the predefined voltage range, the power supply from the external power supply 200 to the external device 300 would be sustained.

For example, as shown in Table 1, when the external power supply 200 is 3C lithium cobalt oxide, the predefined voltage range can be 8.1-12.6V. If a voltage value of the positive voltage input port BAT+ or the positive voltage output port CAR+ obtained by the master-control chip unit 1281 is 13V, which is beyond the predefined voltage range, the master-control chip unit 1281 will switch off the switch control unit K1. Correspondingly, the power supply from the external power supply 200 to the external device 300 will be switched off as well. On the contrary, if a voltage value of the positive voltage input port BAT+ or the positive voltage output port CAR+ is 12V, which is within the predefined voltage range, the power supply from the external power supply 200 to the external device 300 would be sustained. Same rules would be applicable when types of the external power supply 200 are 4F lithium iron phosphate and 4C lithium cobalt oxide.

In one embodiment of the present invention, the switch control unit K1 further comprises a first and second connection units.

Figure 12:
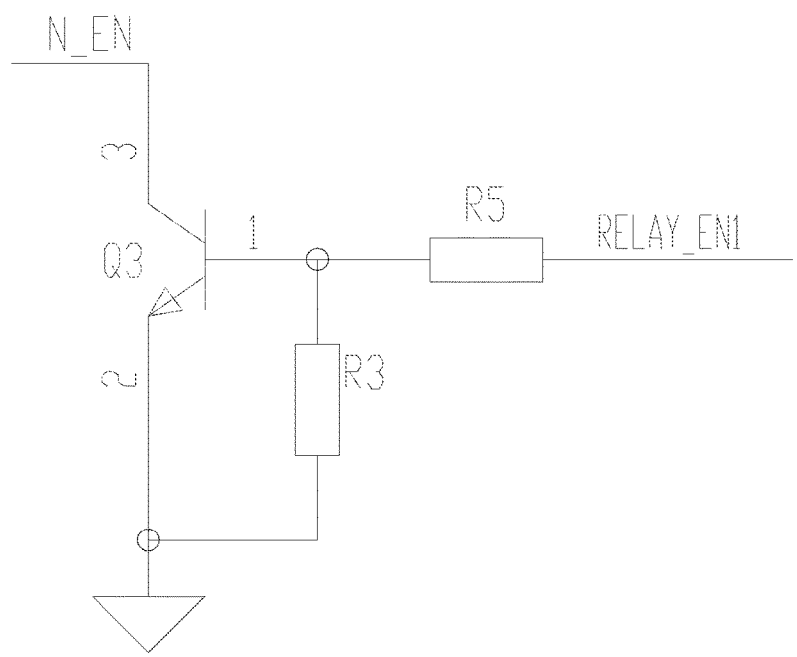
FIG. 12 is a circuit diagram illustrating a first connection unit of a switch control unit according to one embodiment of the present invention.
Figure 13:
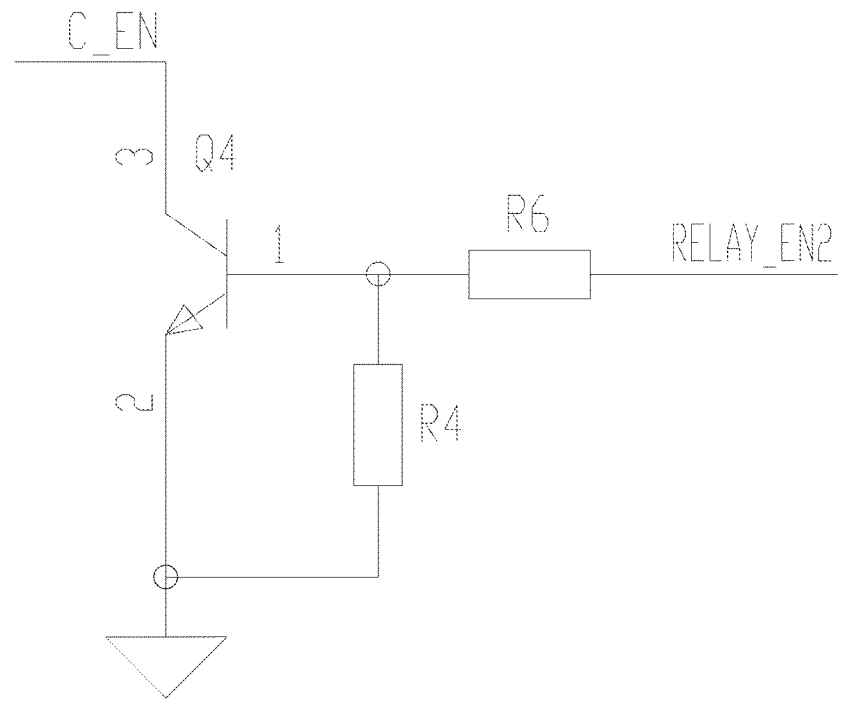
FIG. 13 is a circuit diagram illustrating a second connection unit of a switch control unit according to one embodiment of the present invention.

FIGS. 12 and 13 are circuit diagrams illustrating a first and second connection units of the switch control unit K1 according to one embodiment of the present invention. The switch control unit K1 is connected to the control chip U2 by the first and second connection units.

As shown in FIGS. 12 and 13, the 9$^{th}$ pin of RELAY_EN1 and the 14$^{th}$ pin of RELAY_EN2 of the control chip U2 are connected to the two input ports N_EN and C_EN of the switch control unit K1 respectively. The control chip U2 is configured to control switching on/off of the switch control unit K1 by the two pins.

According to one embodiment of the present invention, after obtaining status information of the external power supply, the control chip U2 of the master-control chip unit 1281 can obtain temperature of a battery unit. Then the control chip U2 is configured to compare the detected temperature with a predefined temperature threshold, which is stored in the master-control chip unit 1281 in advance. If a temperature value of a battery unit exceeds the predefined temperature threshold, the control chip U2 will switch off the switch control unit K1 by means of a pre-stored control program. Accordingly, the power supply from the external power supply 200 to the external device 300 will be switched off as well. On the contrary, if a temperature value of a battery unit does not exceed the predefined temperature threshold, the power supply from the external power supply 200 to the external device 300 would be sustained.

According to another embodiment of the present invention, after obtaining status information of the external power supply, the control chip U2 of the master-control chip unit 1281 can obtain a voltage difference of any two of battery units. Then the control chip U2 is configured to compare the voltages difference between any two of battery units with a predefined voltage difference, which is stored in the master-control chip unit 1281 in advance. If a voltage difference of any two of battery units exceeds the predefined voltage difference of any two of battery units, the control chip U2 will switch off the switch control unit K1 by means of a pre-stored control program. Correspondingly, the power supply from the external power supply 200 to the external device 300 will be switched off as well. On the contrary, if a voltage difference of any two of battery units does not exceed the predefined voltage difference of any two of battery units, the power supply from the external power supply 200 to the external device 300 would be sustained.

In one embodiment of the present invention, the switch control unit K1 comprises a relay switch.

In one embodiment of the present invention, the master-control circuit unit 128 further comprises an anti-inverse detection unit.

Figure 14:
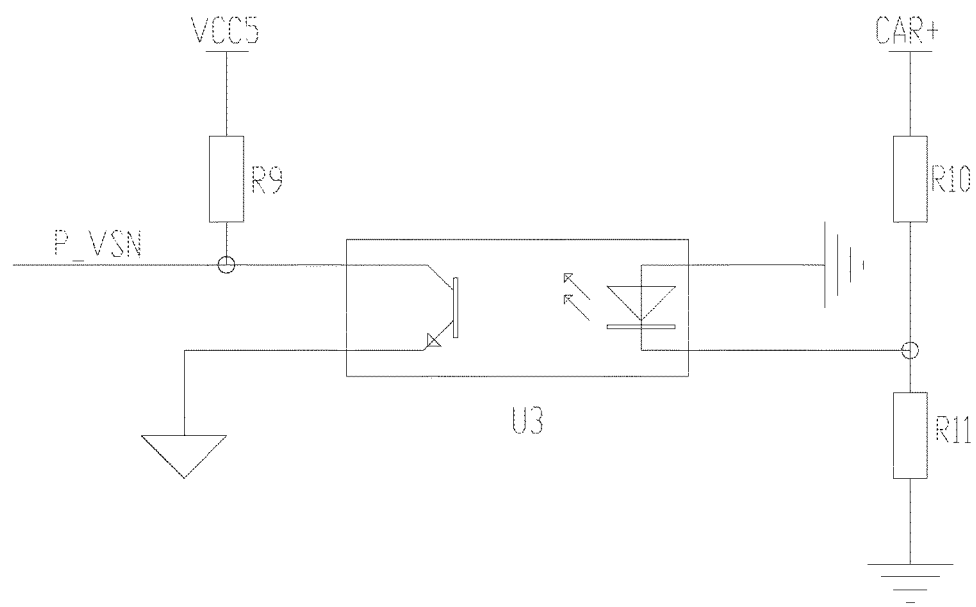
FIG. 14 is a circuit diagram illustrating an anti-inverse detection unit according to one embodiment of the present invention.

FIG. 14 is a circuit diagram illustrating an anti-inverse detection unit according to one embodiment of the present invention. The anti-inverse detection unit is connected to the master-control chip unit 1281 and the positive voltage output port CAR+ for detecting whether a user has inversely connected the first and second wire clamps 21 and 22.

As shown in FIG. 14, the anti-inverse detection unit comprises a photocoupling chip U3 as well as relevant capacitors and resistors. An output port VCC5 of the anti-inverse detection unit is connected to the output port VCC5 of the power control unit for supplying power to the anti-inverse detection unit. A detecting port of the anti-inverse detection unit is connected to the positive voltage output port CAR+ for detecting whether a user has inversely connected the first and second wire clamps 21 and 22. An output port P_VSN of the anti-inverse detection unit is connected to the 10$^{th}$ pin of P_VSN of the control chip U2 for delivering a level signal to the control chip U2.

When the first wire clamp 21 is normally connected to the external device 300, the detecting port of the anti-inverse detection unit is a positive voltage. Correspondingly, a luminous diode in the photocoupling chip U3 is not conductive, and the output port P_VSN of the anti-inverse detection unit will output a high level. When the first wire clamp 21 is inversely connected to the external device 300, the detecting port of the anti-inverse detection unit is a negative voltage. Correspondingly, the luminous diode in the photocoupling chip U3 will be conductive and luminous, and the output port P_VSN of the anti-inverse detection unit will output a low level.

If the 10$^{th}$ pin of P_VSN of the control chip U2 detects a low level, the wire clamps are proved to be inversely connected. Accordingly, the control chip U2 will switch off the switch control unit K1, and the power supply from the external power supply 200 to the external device will be switched off as well. If the 10$^{th}$ pin of P_VSN of the control chip U2 detects a high level, the wire clamps are proved to be normally connected. Accordingly, the power supply from the external power supply 200 to the external device will be sustained.

In one embodiment of the present invention, the master-control circuit unit 128 further comprises an indicator light circuit unit, which is connected to the master-control chip unit 1281. The indicator light circuit unit comprises two LED with different colors for indicating normal or abnormal conditions of the control device.

In one embodiment of the present invention, the master-control circuit unit 128 further comprises a buzzing circuit unit, which is connected to the master-control chip unit 1281. The buzzing circuit unit mainly comprises a loudspeaker for alerting a user about abnormal conditions.

To sum up, a communication connection between the battery clamp 100 and the external power supply 200 can be built for obtaining status information of the external power supply 200. The status information comprises temperature of battery units, or a voltage difference of any two of battery units of the external power supply. Meanwhile, the battery clamp 100 has functions of electric current or voltage detection and anti-inverse detection etc. Therefore, the battery clamp 100 can effectively solve the problems of a lithium battery in the external power supply 200 e.g. battery bulge or explosion resulted from improper uses.

Although the aforesaid embodiments are preferred in the present invention, none of them shall be regarded as a limitation. Any modifications, improvements, or equivalents within spirit or scope of the preset invention fall into the protection scope of the present invention.

What is claimed is:

1. A battery clamp for delivering an instantaneous starting current from an external power supply to an external device, the battery clamp comprising:
    a control device, comprising:
        a housing;
        a master-control board mounted within the housing; and
        connectors disposed at one side of the housing, and being electrically connected to the master-control board, comprising:
            at least a first and second electrode connectors, which are connected to an external power supply for receiving power, and
            at least one communication connector connected to the external power supply for receiving status information of the external power supply, and sending the status information to the master-control board;
    a first and second wire clamps, each having an end configured to receive power from the external power supply via the control device, and another end connected to the external device for supplying power to the external device;
    wherein the control device is configured to control power supply from the external power supply to the external device based on the status information.

2. The battery clamp of claim 1, wherein the control device is configured to allow the power supply from the external power supply to the external device when the status information is normal, wherein the status information comprises at least one of the following: temperature, voltage of a battery unit of the external power supply.

3. The battery clamp of claim 1, wherein the master-control board comprises:
    a first and second voltage input ports electrically connected to the first and second electrode connectors respectively;
    a communication port electrically connected to the communication connector;
    a first and second voltage output ports electrically connected to the first and second wire clamps for supplying power to the external device via the first and second wire clamps;
    a switch control unit for controlling connection between the first voltage input port and the first voltage output port; and
    a master-control circuit unit connected to the communication port for obtaining the status information of the external power supply;
    wherein the master-control circuit unit is configured to control the switch control unit based on the status information of the external power supply, thereby controlling connection on/off between the first voltage input port and the first voltage output port.

4. The battery clamp of claim 3, wherein the master-control circuit unit further comprises:
    an electric current detection unit for detecting electric current from the external power supply to the external device;
    a voltage detection unit for detecting voltage of the external power supply and the external device; and
    wherein the master-control circuit unit is configured to compare the electric current value and the voltage value with a predefined electric current range and a predefined voltage range respectively, thereby controlling the switch control unit.

5. The battery clamp of claim 4, wherein the voltage detection unit comprises:
    a first voltage detection unit for detecting voltage value of the external power supply; and
    a second voltage detection unit for detecting voltage value of the external device.

6. The battery clamp of claim 4, wherein the master-control circuit unit further comprises:
    an indicator light circuit unit connected to the master-control chip unit for indicating operating status of the control device.

7. The battery clamp of claim 4, wherein the master-control circuit unit further comprises:
    a buzzing circuit unit connected to the master-control chip unit for alerting users about abnormal condition.

8. The battery clamp of claim 1, wherein the communication connector is disposed between the first and second electrode connectors.

9. The battery clamp of claim 1, wherein the housing comprises an upper piece and a lower piece, which are removably connected together, and the master-control board is mounted on the lower piece.

10. The battery clamp of claim 9, wherein one side of the upper piece is provided with openings for indicator lights and buttons.

* * * * *